Sept. 14, 1948.　　　F. P. ATHANS　　　2,449,045
EXPANSIBLE FISH HOOK
Filed Jan. 17, 1947

FRANCIS P. ATHANS
INVENTOR

BY *Herbert J. Brown*
ATTORNEY

Patented Sept. 14, 1948

2,449,045

UNITED STATES PATENT OFFICE 2,449,045

EXPANSIBLE FISHHOOK

Francis P. Athans, Fort Worth, Tex.

Application January 17, 1947, Serial No. 722,539

2 Claims. (Cl. 43—36)

1

This invention relates to fish hooks, and more particularly to fish hooks having multiple spring actuated hooks at the ends thereof.

An object of the invention is to provide, in a fish hook of the referred to class, means whereby the spring action of the hooks may be efficiently and effectively actuated.

Another object of the invention is to provide, in addition to the foregoing object, means whereby the actuated hooks are limited in their movement so as to be more conveniently handled, such as when setting the hooks and when removing the hooks from the mouth of a fish.

These and other objects will become apparent from the following description of an exemplary form of the invention shown in the accompanying drawing, wherein.

Accordingly, the form of the invention shown includes two depending shanks 1 and 2 joined at their upper ends with an integral spring 3. Hook members 4 and 5 are formed at the lower ends of the shanks 1 and 2, respectively. The hook members 4 and 5 each include barbs 6 at their ends, and which barbs are outwardly directed with respect to each other.

Figure 1:
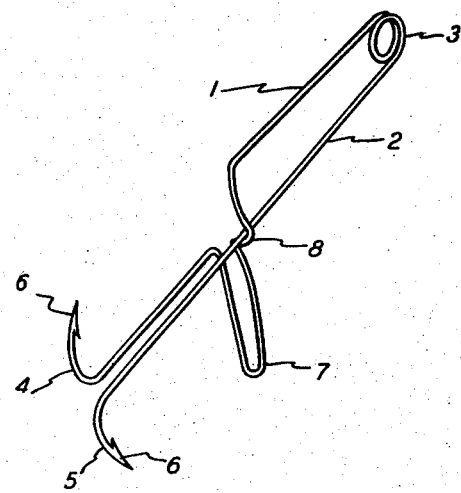
Figure 1 is a perspective view of a double barbed fish hook embodying the features of the present invention.
Figure 2:
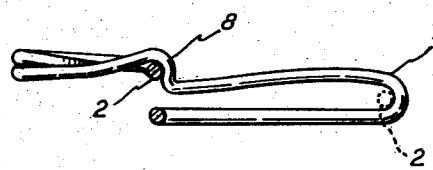
Figure 2 is an enlarged lateral sectional view taken on lines 2—2 of Figure 3 and particularly showing a lateral bend employed in the trigger mechanism of the invention.

One of the shanks 1 is provided with a laterally disposed U-shaped bend 7, one leg of which is provided with another lateral bend 8 to slidably and frictionally engage the other or straight shank 2 of the device. As particularly shown in Figure 2, the referred to small bend 8 serves as a latch for engaging the straight shank 2 and for maintaining the hooks 4 and 5 in juxtaposition when the device is baited and set. Also shown in Figure 2, the end of the U-bend 7 receives the straight shank 2 when the device is in its expanded position, and thus limits the relative outward movement of the hooks 4 and 5.

2

Figure 3:
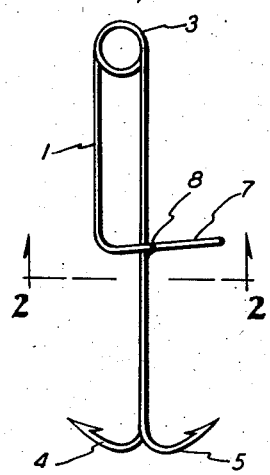
Figure 3 is a side elevational view of the fish hook illustrated in Figure 1, and showing the same in its contracted or set position.
Figure 4:
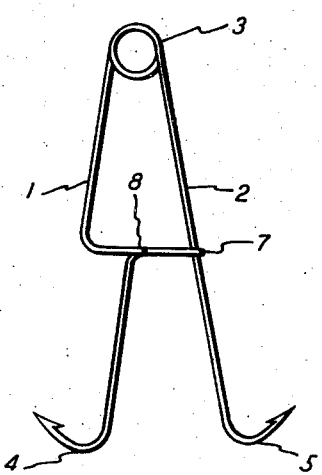
Figure 4 is a side elevational view, similar to Figure 3, showing the hook in its expanded or actuated position.

In operation, one or both of the hooks 4 and 5 are baited and the straight shank 2 is engaged upon the small bend 8 of the larger bend 7, as shown in Figure 3. The action of a fish in taking the bait will release the straight shank 2 from its engagement on the small bend 8, and the spring 3 will cause the hooks 4 and 5 to spring outwardly from each other, and thus catch the fish on both of the said hooks.

The fish is released from the hooks 4 and 5 by moving the shanks 1 and 2 together between the forefinger and thumb of one hand, thus leaving the other hand free to hold fish. The limiting action of the large bend 7 generally lends toward making the device easier to handle at all times.

What is claimed is:

1. A fish hook comprised of a pair of shanks having hooks at corresponding ends thereof and including a spring therebetween for normally diverging the same, and a lateral bend in one of said shanks for engaging the other of said shanks when said hooks are in their expanded position, and a smaller lateral bend on the first named bend for detachably engaging the other of said shanks.

2. A fish hook comprised of a pair of shanks having hooks at corresponding ends thereof and outwardly directed with respect to each other, a coiled spring between said shanks for normally diverging the same and a lateral bend in one of said shanks for engaging the other of said shanks when said hooks are in their expanded position and a smaller lateral bend on the first named bend for detachably engaging the other of said shanks.

FRANCIS P. ATHANS.

REFERENCES CITED

The following references are of record in the file of this patent:

UNITED STATES PATENTS

| Number | Name | Date |
|---|---|---|
| 814,624 | Robinson | Mar. 6, 1906 |

FOREIGN PATENTS

| Number | Country | Date |
|---|---|---|
| 287,008 | Great Britain | Mar. 15, 1928 |